Dec. 23, 1958     G. A. LYON     2,865,682
WHEEL COVER
Filed June 11, 1956
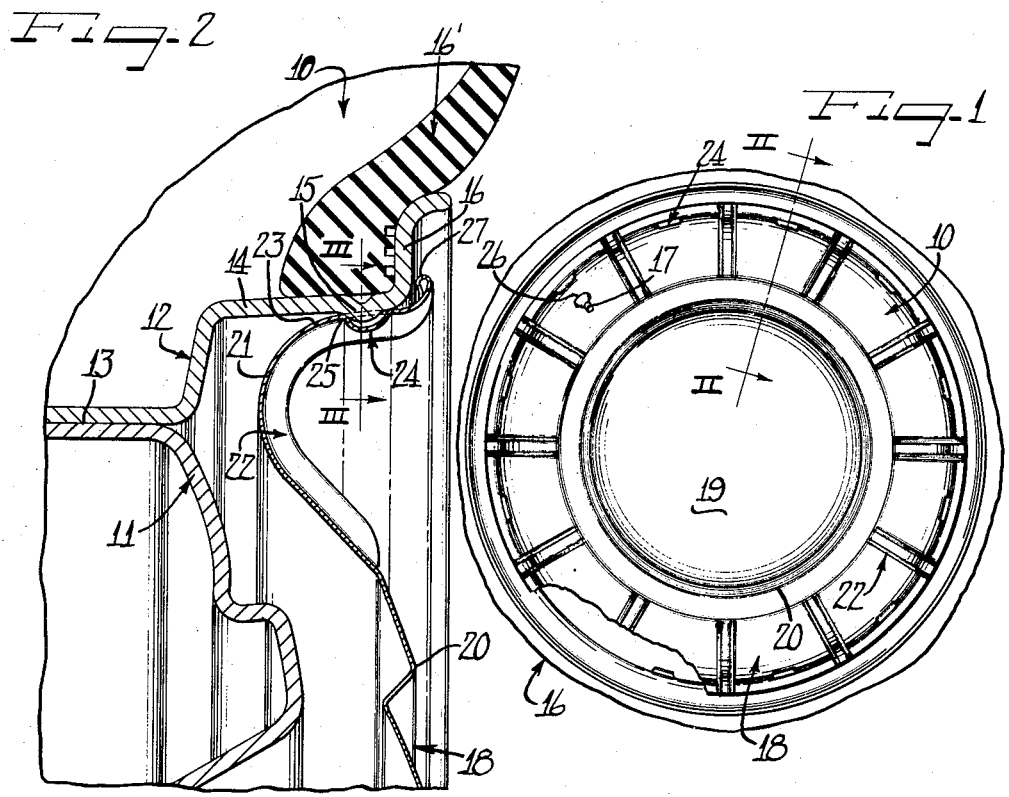
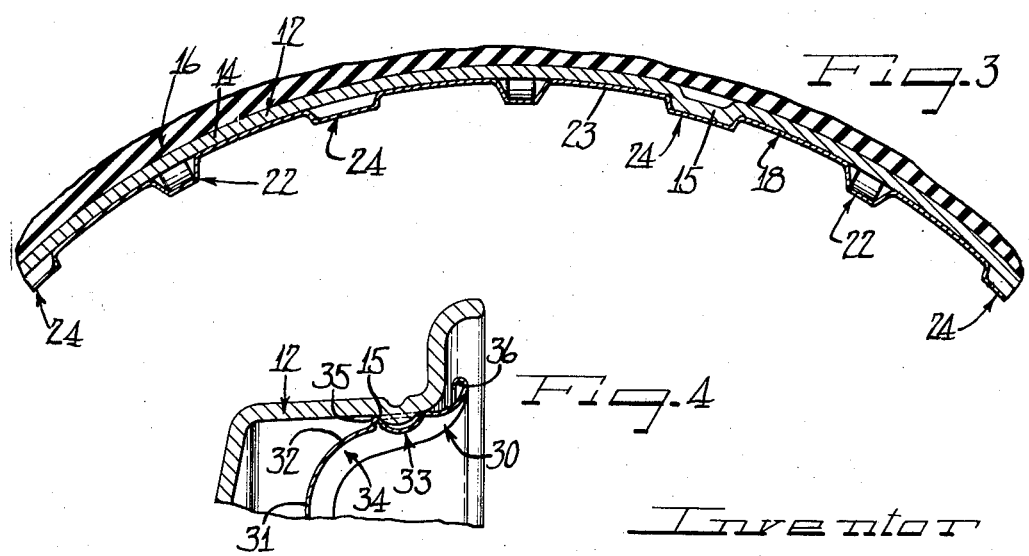
Inventor
George Albert Lyon United States Patent Office 2,865,682
Patented Dec. 23, 1958

2,865,682
WHEEL COVER
George Albert Lyon, Detroit, Mich.
Application June 11, 1956, Serial No. 590,623
6 Claims. (Cl. 301—37)

This invention relates generally to wheel structures and more particularly to a new and improved cover construction for retained protective disposition upon a vehicle wheel.

More specifically, this invention relates to a wheel having circumferentially spaced protuberances which are adapted to cooperate with circumferentially spaced edges on the cover. These edges are positioned immediately axially adjacent circumferentially spaced embossed indentations or recesses in a dished cover portion. Following the cross section of the dished portion are circumferentially spaced pressed out reinforcing ribs which are spaced from one another by the recesses or pockets.

Accordingly, an object of this invention is to provide a new and improved retaining action between a wheel cover member and a vehicle wheel.

Still another object of this invention is to provide a highly ornamental wheel cover member which has means for cooperation with circumferentially spaced bumps on a wheel to retain the cover member thereupon.

A further object of this invention is to provide means in the form of radial ribs for reinforcing the dished intermediate cover portions to aid in the development of a desired retaining action between the cover and wheel.

According to the general features of this invention there is provided in a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, the dished portion having a generally axial portion of greater width than the axial dimension of the protuberances, the axial portion having rib-like shoulder means between the radially extending ribs normally lying in a circle of a diameter so that the shoulder means can fit under tension retainingly behind the protuberances, the axial portion being recessed in offset relation to the shoulder means for registration with the wheel protuberances, the recess being defined on its axially inner side by the shoulder means and the shoulder means being resiliently deflectable out of the circle at the protuberances when pressed against the wheel protuberances for entry of the protuberance in the recess and resilient gripping engagement of the shoulder means behind the protuberances to retain the cover member on the wheel, and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances.

Other objects and features of the present invention will more fully become apparent in view of the following detailed description taken in connection with the accompanying single sheet of drawings illustrating therein several embodiments and in which:

Figure 1 is a side elevation of my wheel structure;

Figure 2 is an enlarged fragmentary cross sectional view taken substantially on the line II—II of Figure 1 looking in the direction indicated by the arrows;

Figure 3 is an enlarged fragmentary cross sectional view taken substantially on the line III—III of Figure 2 looking in the direction indicated by the arrows; and Figure 4 is a view similar to Figure 2 but illustrating a modified cover construction.

As shown on the drawings:

The reference numeral 10 indicates generally my wheel structure including a wheel having body and rim parts 11 and 12 suitably connected together at 13. The body part 11 lends itself to being attached to an axle of an automobile vehicle or the like by means of inserting lugs on the axle through apertures in the body part and thereafter screwing nuts onto the lugs to clamp the wheel to the axle. The tire rim 12 is herein illustrated as a multi-flanged drop center type of tire rim including an intermediate axial flange 14 having a suitable number such as four circumferentially spaced pressed out protuberances 15. At the axially outer margin of the rim flange 14 is a generally radially outwardly extending rim flange 16.

Carried upon the tire rim 12 is a tire assembly 16 which may be either a pneumatic tire and tube assembly or a tubeless tire assembly and in either case is adapted to be inflated by means of inserting air through valve stem 17 (Figure 1).

Adapted to be disposed on the wheel in protective overlying relation is my highly ornamental cover member 18 which may be made from any suitable material with excellent results being attainable through the making of the cover from spring steel of the stainless type. This type of cover may be polished to a lustrous highly ornamental finish.

The cover 18 includes an enlarged central crown 19 bounded at its outer periphery by an annular rib 20. The rib 20 in turn leads into an intermediate dished portion 21 which is disposed generally axially outwardly of and opposite the junction 13 of the rim and body parts. The dished portion 21 has circumferentially spaced generally axially outwardly pressed out arcuate ribs 22 each of which generally follows the cross sectional configuration of the dished portion 21. These ribs 22 not only serve to ornamentally enhance the appearance of the cover 18 but in addition aid in the attainment of a predetermined resiliency or retaining action between the cover and the protuberances 15.

The dished cover portion 21 includes a generally axially outwardly extending cover portion 23 which comprises segments or deflectable areas which are separated from one another by the ribs 22. Pressed out between the ribs 22 on each of the axial portions or segments 23 are embossed indentations or pockets or recesses 24.

Each of the recesses 24 has an axially inner edge 25 which edges 25 are arranged in a common circle normally having a diameter slightly larger than the inside diameter of the intermediate rim flange 14. The protuberances 15 are also arranged in a common circle so that when the valve stem 17 is aligned with cover opening 26 certain of the pockets 24 and the bumps 15 are adapted to be in axial alignment with one another. The present form of my invention shows the cover to have 12 pockets or recesses 24 and the cover with a corresponding number of ribs 22.

In the application of the cover 18 to the wheel, after the valve stem has been aligned with the cover opening 26, and upon the application of adequate force, the edges 25 are progressively cammed over the protuberances 15 until they are firmly nested and bottomed behind the protuberances 15. In this connection it will be appreciated that after the valve stem has been passed through the cover opening at least two of the recesses may be interlocked with respect to associated protuberances at one side of the cover whereupon the application of an axially inward force upon the other side of the cover the edges 25 are caused to be deflected and moved axially inwardly over the associated protuberances to complete the assembly of the cover upon the vehicle wheel.

The cover 18 terminates in an underturned pry-off bead 27 which is disposed generally opposite the rim flange 16. To remove the cover from the wheel a suitable pry-off tool may be inserted underneath the bead 27 and upon the application of a suitable pry-off force, the edges 25 may be disengaged from behind the protuberances 15.

When the cover is in full disposition upon the wheel, it will be appreciated the pockets 24 are adapted to nest over the protuberances 15 in such a manner as will insure that the cover will corotate with the wheel.

In Figure 4 is shown a modified cover 30 which is adapted to be retainingly disposed upon the tire rim 12 and more particularly the pressed out protuberances 15 in the same manner as in Figures 1–3. In this instance, however, the cover 30 includes a dished portion 31, which in turn includes a generally axially outwardly extending cover portion 32. The cover portion 32 has circumferentially spaced pockets 33. Generally following the cross sectional configuration of the dished intermediate cover portion 31 are circumferentially spaced struck or pressed out ribs 34 which are separated from one another by the protuberances 33. Defining the axially inside edge of the recess 33 is an axially outwardly pressed out arcuate rib 35. This rib 35 is considerably wider than the width of the protuberance 33 and may extend from one rib 22 to the generally opposed and circumferentially spaced adjacent rib 22.

The pocket or indentation 33 is again adapted to interlock with the protuberance 15 in such a manner to insure corotation of the cover 30 upon the wheel. To assemble the cover upon the wheel, much the same method may be followed as in the previously described form of my invention. In other words, the pockets 33 are initially axially aligned with the protuberances 15. The pockets 33 and more particularly the arcuate ribs 35 are then urged against the protuberances 15 whereupon the ribs 35 are cammed over the protuberances into bottomed engagement therebehind. To remove the cover from the wheel, a suitable pry-off tool may be inserted underneath bead 36 on the outer margin of the cover and upon the application of leverage forces the cover may be ejected from the wheel.

In both forms of my invention it is apparent the ribs 22 and 34 generally follow the cross sectional configuration of the intermediate dished portion and divide the cover into a plurality of segments. By spacing the ribs 22 a predetermined distance apart from one another with reference to the pockets 24 and 33 a predetermined spring action is attainable. The cover may be sprung into retained disposition behind the protuberances by either utilizing the axially inner edge of the protuberance or by pressing out a rib at the axially inner edge of the protuberance which may extend a substantially greater distance than the width of the pocket or recess.

It will be understood that modifications and variations may be effected without departing from the scope of the novel concepts of the present invention, but it is understood that this application is to be limited only by the scope of the appended claims.

I claim as my invention:

1. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel, and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances.

2. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances, said shoulder means comprising an axially inner edge of said recess.

3. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances, said shoulder means comprising a resilient arcuate pressed out rib between said radially extending ribs with said arcuate resilient pressed out rib intersecting said recess generally at an axially inner edge portion of said recess.

4. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances, said radially extending ribs being pressed out axially outwardly of said cover and following generally the configuration of said dished cover portion.

5. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances, said shoulder means comprising edges for bottoming on the wheel axially inward and radially behind the protuberances.

6. In a wheel structure, a wheel including tire rim and body parts one of which has a plurality of generally radially extending protuberances disposed generally in a common circle about the axis of the wheel, and a circular wheel cover member for overlying retained disposition upon the wheel including a dished portion provided with circumferentially spaced generally radially extending ribs, said dished portion having a generally axial portion of greater width than the axial dimension of said protuberances, said axial portion having rib-like shoulder means between said radially extending ribs normally lying in a circle of a diameter so that said shoulder means can fit under tension retainingly behind said protuberances, said axial portion being recessed in offset relation to said shoulder means for registration with the wheel protuberances, said recess being defined on its axially inner side by said shoulder means and said shoulder means being resiliently deflectable out of said circle at said protuberances when pressed against the wheel protuberances for entry of the protuberance in said recess and resilient gripping engagement of said shoulder means behind the protuberances to retain the cover member on the wheel and localized deflectable cover areas on said axial portion disposed in the vicinity of said shoulder means and said recess which deflectable cover areas are substantially circumferentially confined between pairs of the radially extending ribs and which deflectable cover areas are deflectable upon the axial movement of the shoulder means across the protuberances, said recesses comprising embossed indentations with said shoulder means including axially inner edge portions of said indentations resiliently yieldable in unison as applied to the protuberances.

References Cited in the file of this patent

UNITED STATES PATENTS

| D. 171,303 | Lyon | Jan. 19, 1954 |
| 2,624,640 | Lyon | Jan. 6, 1953 |
| 2,631,066 | Horn | Mar. 10, 1953 |